April 10, 1934.    A. B. STICKNEY    1,954,686
GEARING
Original Filed June 12, 1931    3 Sheets-Sheet 1

Inventor
A. B. Stickney
By Horace C. [Chandlee]
Attorney

Inventor
A. B. Stickney

April 10, 1934.    A. B. STICKNEY    1,954,686
GEARING
Original Filed June 12, 1931    3 Sheets-Sheet 3
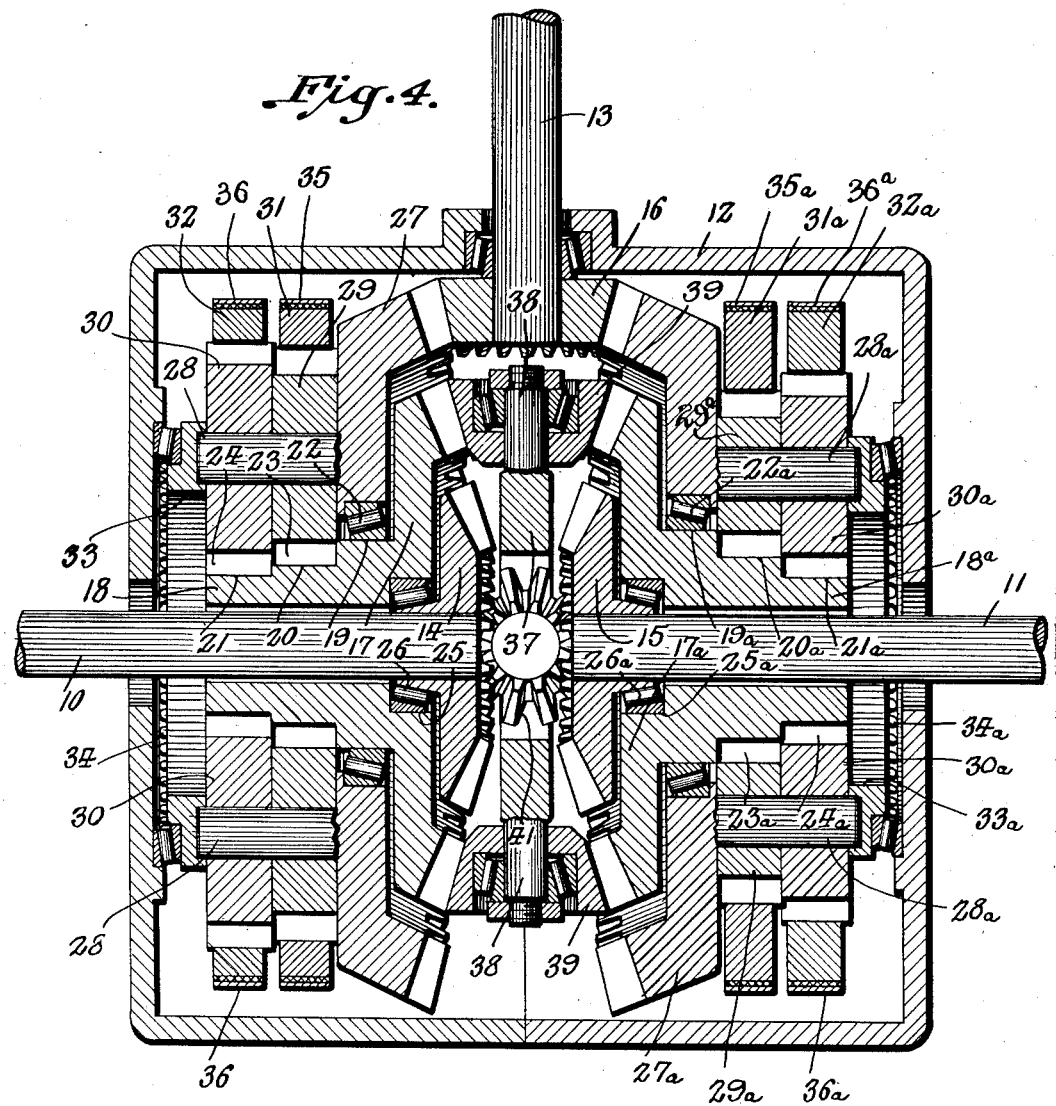

Patented Apr. 10, 1934

1,954,686

UNITED STATES PATENT OFFICE 1,954,686

GEARING

Alpheus B. Stickney, New York, N. Y.

Application June 12, 1931, Serial No. 543,967
Renewed February 26, 1934

6 Claims. (Cl. 74—314)

This invention relates to new and useful improvements in mechanical movements, and particularly to mechanical movements, in the form of gearing.

One object of the invention is to provide a novel mechanical movement, in the form of a gearing, which is especially designed for driving automobiles, and wherein a comparatively large number of different driving speeds may be obtained, both forwardly and rearwardly.

Other objects and advantages will be apparent from the following description when taken in connection with the accompanying drawings.

In the drawings:

Figure 4 is a vertical sectional view on the line 4—4 of Figure 2.

Figure 5 is a sectional detail view, showing the application of the invention to a single shaft, and wherein the differential is omitted.

Figure 1:
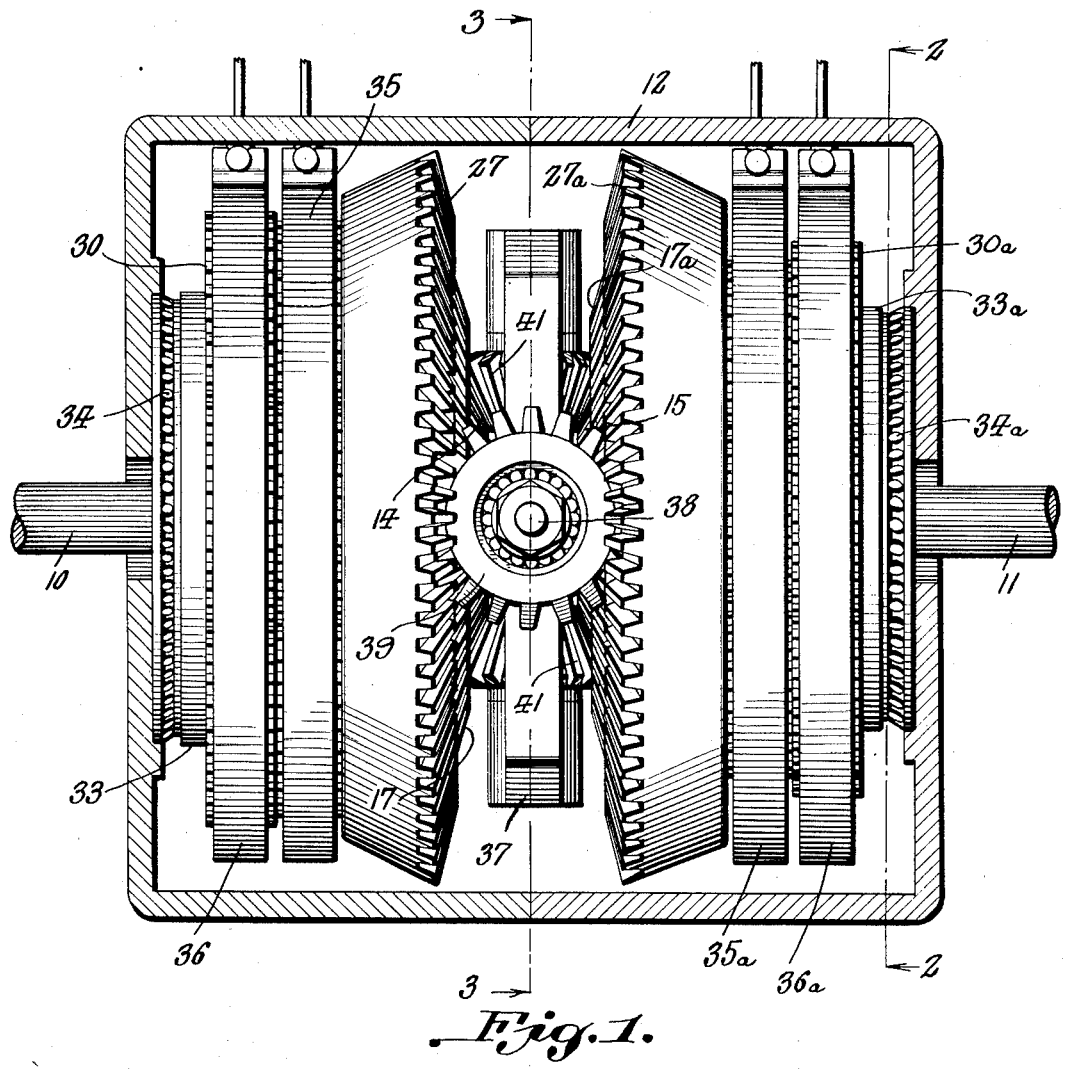
Figure 1 is a front elevation of a gearing made in accordance with the present invention, the casing being shown in section.
Figure 2:
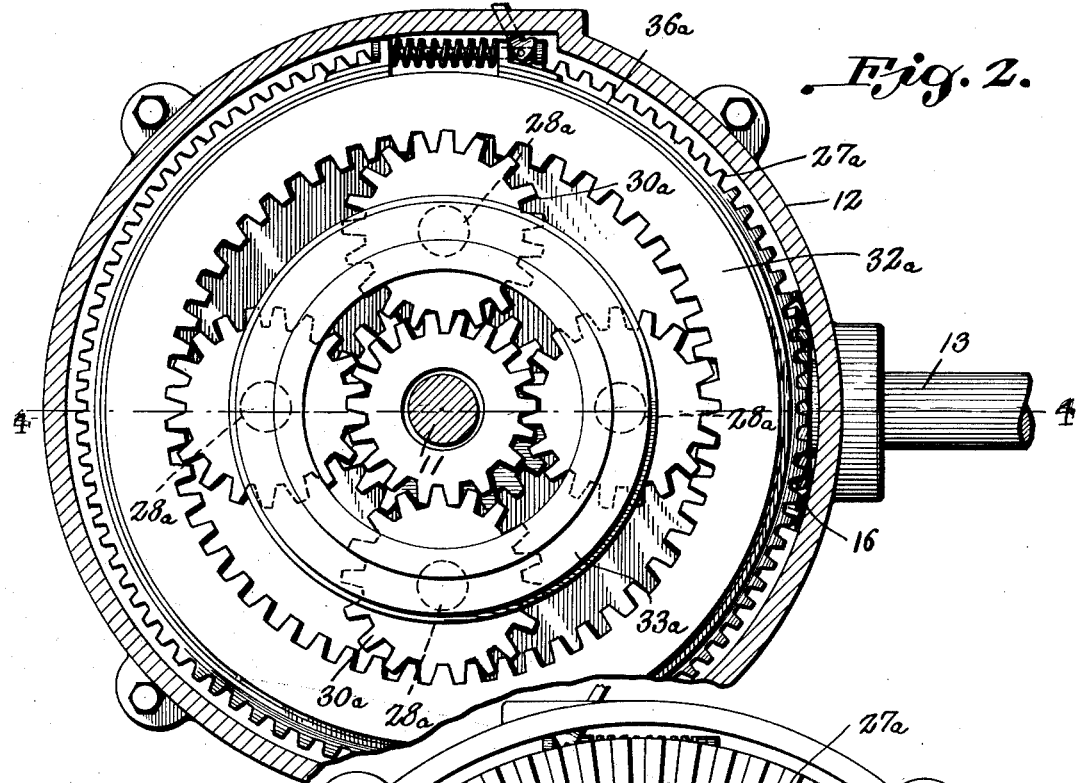
Figure 2 is a vertical sectional view on the line 2—2 of Figure 1.
Figure 3:
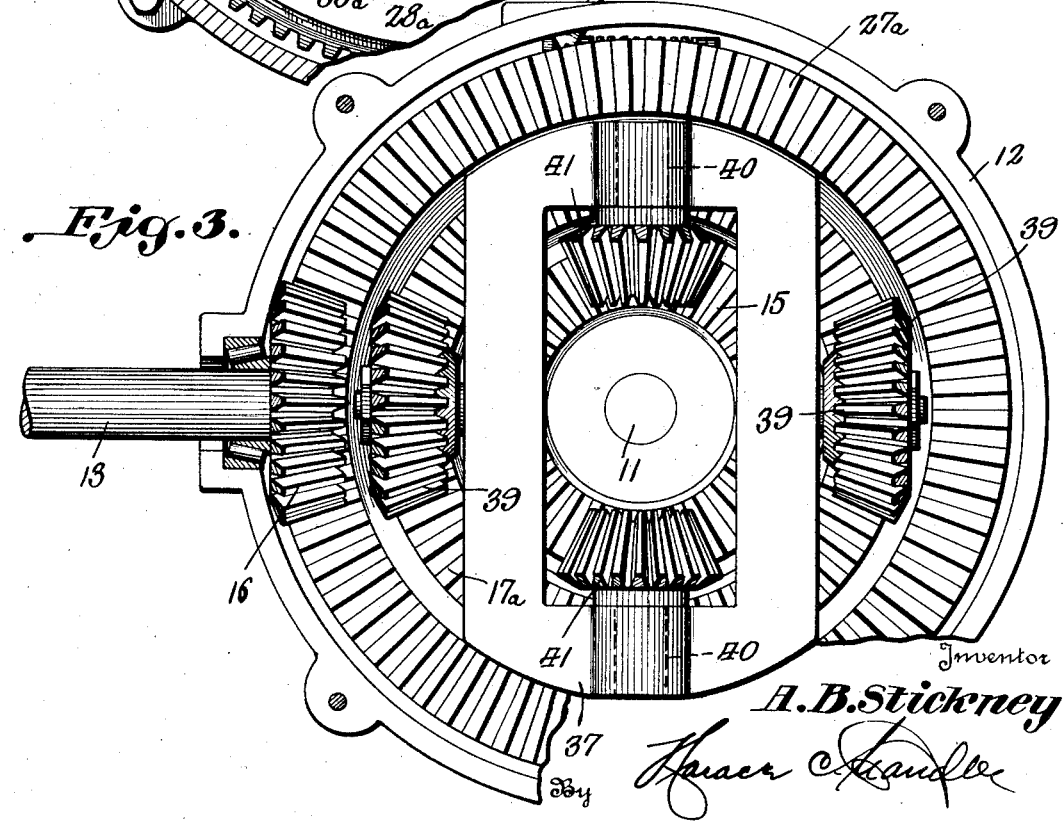
Figure 3 is a vertical sectional view on the line 3—3 of Figure 1.

Referring particularly to the accompanying drawings, 10 and 11 represent the two sections of the front axle of an automobile, which are mounted in a casing 12, and project from the opposite sides thereof, while 13 is the drive shaft, or propeller shaft, leading from the motor, of the automobile, not shown. The inner ends of the shafts or axle sections 10 and 11, are provided with the bevel gears 14 and 15, respectively, while the inner end of the propeller shaft 13 is provided with a bevel gear 16. Loosely rotatable on the axle section 10 is a bevel gear 17, having a hub portion 18, the outer face of which is formed with the three reductions in diameter, as indicated at 19, 20, and 21, respectively, the former being arranged to support antifriction rollers 22, while the other two reductions are provided with external gear teeth, shown at 23 and 24, respectively. In the center of the gear 17 is a recess 25, within which are arranged the antifriction rollers 26, which cooperate with the axle section 10, as clearly shown in the drawings. Mounted for rotation on the rollers 22, is a bevel carrier gear 27, of slightly greater diameter than the bevel gear 17, and formed on the outer face of the carrier gear 27, are the regularly spaced stub shafts 28, each rotatably supporting a pair of planet gears 29—30, which mesh respectively with the stepped gear portions 20 and 21, of the hub 18, and with the internal teeth of the ring gears 31 and 32, respectively, arranged outwardly of the said planet gears. The outer ends of the stub shafts 28 are supported in a ring 33, which has antifrictional engagement with the adjacent wall of the casing 12, through the medium of the antifriction rollers 34. Disposed concentrically outward of the ring gear 31 is a brake band 35, while a similar brake band 36 is disposed concentrically outward of the ring gear 32, said bands being adapted to be drawn into frictional engagement with the gears, by any suitable or well known means, whereby to hold said gears against rotation, for the successful operation of the device, as will be clearly brought out, later herein, in the description of the operation of the gearing.

Rotatable on the shaft or axle section 11, outwardly of the gear 15, is a gear 17ª, having the hub 18ª, the outer face of which is formed with the three reduced portions 19ª, 20ª, and 21ª respectively. In the center of the gear 17ª is a recess 25ª, within which are arranged the antifriction rollers 26ª, which cooperate with the axle section 11, as clearly shown in the drawings. The reduction 19ª supports antifriction rollers 22ª, while the other reductions are formed with the gear teeth 23ª and 24ª, respectively. Mounted for rotation on the rollers 22ª is a bevel carrier gear 27ª, of slightly greater diameter than the bevel carrier gear 17ª, and formed on the outer face of the bevel gear 27ª are the regularly spaced stub shafts 28ª, each rotatably supporting a pair of planet gears 29ª—30ª, which mesh respectively, with the stepped gear portions 20ª—21ª, of the hub 18ª, and with the internal teeth of the gear rings 31ª and 32ª, arranged outwardly of the said planet gears. The outer ends of the stub shafts 28ª are supported in a ring 33ª, which has antifriction engagement with the adjacent wall of the casing 12, through the medium of the antifriction rollers 34ª. Arranged concentrically outward of the ring gears 31ª and 32ª are the brake bands 35ª and 36ª, operable in any suitable or well known manner, for the purpose of holding said ring gears against rotation, at times, to permit the proper operation of the planet gears.

Disposed between the inner ends of the axle sections 10 and 11, is a spider 37, which is adapted to rotate between the gears 14 and 15, and 17 and 17ª, and which has extending from the outer periphery, at a plurality of equally spaced points, the rotatable shafts 38. Fixed on the outer ends of these shafts 38 are the bevel gears 39, which mesh with the gears 17 and 17ª. Similar rotatable shafts 40 extend inwardly toward the interior of the spider, and such shafts have fixed on their projecting ends the bevel gears 41, which mesh with the gears 14 and 15.

Under all conditions the gear 16 drives the bevel carrier gear 27 in one direction, and the bevel carrier gear 27ª in the opposite direction, said gears carrying the planet gears with them. The planet gears will roll idly around the toothed portions of the hubs 18 and 18ª, while their outer portions will cause the ring gears to rotate in the same direction, respectively. Neither the gears 17—17ª, nor the axle sections 10—11, will then be affected by the planet gears. When, however, one of the brake bands, as for instance the brake band 36, is drawn up so as to hold the gear ring 32 from rotation, the corresponding planet gears 30 will roll around, within the ring thus held, while the inner portions of the said planet gears will cause the rotation of the bevel gear 17, through the engagement of the teeth of the planet gears with the teeth 24 of the hub 18, of said gear 17.

It is to be understood that the carrier gears 27 and 27ª are of the same diameter, and that the gears 17 and 17ª are also of the same diameter. The planet gears differ in diameter, that is the gears of each group 29ª, 30, and 30ª, differ in diameter from the gears of each of the other groups, with the exception of the groups 29 and 30ª, which are alike. The stub shafts 28, of the carrier gear 27, are arranged at greater distances from the center of the gears than the stub shafts 28ª, and also the stepped gear portions 20 and 21ª are of different diameters, thus producing the effect in speed difference, corresponding to that resulting from having the gears 29 and 30ª of different diameters, and their stub shafts at points, on the carrier gear 27, corresponding to the stub shafts 26ª.

While the accompanying drawings are not made to any definite scale, it is to be assumed that the showing will produce the following results: If the drive shaft 13 is rotating at a speed of 3000 R. P. M., and the gear ring 32 is held against rotation, the gear 17 will be driven at a speed of 4400 R. P. M., if the gear ring 31 is held against rotation, the gear 17 will be driven at a speed of 4000 R. P. M., in each instance, in the same direction, while, if the gear ring 31ª is held against rotation, the gear 17ª will be driven at a speed of 4200 R. P. M., if the gear ring 32ª is held against rotation, the gear 17ª will be driven at a speed of 3400 R. P. M., in each instance in a reverse direction to that of the gear 17. It is necessary, to the successful operation of the device, that two of the ring gears be held against rotation, at the same time, and that they be located at opposite sides of the center of the gearing. It will thus be understood that, if the gear 17 rotates at a greater speed than the gear 17ª, the spider will rotate in one direction, but said spider will rotate in the opposite direction, if the speed of the gear 17ª is greater than that of the gear 17. When two of the gear rings, one at each side of the center of the gear construction, are thus held against rotation, the gears 17 and 17ª will rotate in opposite directions, and at different speeds, so that the gear 17 will tend to rotate the gears 39, of the spider, at its particular speed, while the gear 17ª will tend to rotate the said gears 39 at its particular speed, with the result that the said gears 39 will not only rotate on their shafts 38, but will revolve, bodily, between the gears 17 and 17ª, and carry with them the spider 37, thus causing the spider to rotate. The speed and motion of the spider are transmitted to the axle sections 10 and 11, through the medium of the well known differential gearing, represented by the gears 14, 15, and 41.

If, for example, the ring gears 32 and 32ª are held, the spider will rotate, in one direction, at a speed of 500 R. P. M., and if the rings 31 and 32ª are held, the spider will rotate at a speed of 300 R. P. M., in the same direction, above mentioned, or if the rings 32 and 31ª are held, the spider will rotate, in the same direction, mentioned above, at a speed of 100 R. P. M. If, however, the rings 31 and 31ª are held, the spider will rotate in a direction opposite to that above mentioned, at a speed of 100 R. P. M. Furthermore, by increasing the number of gear rings, or reducing the number thereof, together with the associated planet gears, carried thereby, a greater number of different relative speeds in the gears 17 and 17ª, can be obtained by the speed of rotation of the spider, with the consequent variation in the number of speeds of the driven shaft.

While I have described my invention as applied to one specific embodiment, it will be apparent that the same is capable of a considerable range of variations, from the particular details herein illustrated. It is, therefore, the intention, in the appended claims, to cover all legitimate modifications and adaptations, of the present invention which will, no doubt, suggest themselves to one skilled in the art, as a result of the present disclosure.

It will be understood that this invention may be used for driving a shaft at different rates of speed, wherein a differential is not necessary, as, for instance, in connection with a hoisting device. In such cases the spider 37, or its equivalent, will be connected directly to the driven shaft, and the gears 14, 15, and 40, omitted. This is clearly illustrated in Figure 5, which is a view similar to Figure 4, but showing the spider 37, secured directly to the shaft 42, and the gears 14, 15, and 40 omitted. In this case the shaft 42 will be driven at different speeds, directly from the spider 37, such speeds being governed by the difference in the speeds of the gears 27 and 27ª, acting directly upon the spider. The direction of rotation of the shaft 42 will also be governed by the action of the gears 27 and 27ª upon the spider. In doing away with the gears 14, 15, and 40, it is not necessary that so large a spider be used, such spider being reduced to a mere hub, as shown, with the shafts 38, of the gears 39 radiating therefrom.

It is to be understood that the expression "driven shaft", as used in the appended claims, designates either a shaft consisting of two sections 10 and 11, connected by a differential, as shown in Figure 4 of the drawings, or a continuous shaft, as shown at 42.

What is claimed is:

1. In a power transmission device, a drive shaft, a driven shaft having fixed gears, loose gears on the driven shaft, means driven by the drive shaft for rotating said loose gears at variable different relative speeds, and means between the loose gears and the fixed gears for rotating the driven shaft in a direction and at a speed governed by the relative speeds of the loose gears.

2. In a power transmission device, a drive shaft, a driven shaft, gears fixed on the driven shaft, loose gears on the driven shaft, a spider driven by the loose gears and in driving relation to the fixed gears, and gear connections between the driving shaft and the loose gears for governing the speed and direction of the latter and of the driven shaft.

3. In a power transmission device, a drive shaft, a driven shaft, gears fixed on the driven shaft, loose gears on the driven shaft, a spider driven by the loose gears and in driving relation to the fixed gears, and gearing driven by the driving shaft and in operative relation to the loose gears for governing the speed and direction of rotation of the loose gears and the driven shaft, said gearing including sun gears on the loose gears, carrier gears driven by the drive shaft, planet gears on the carrier gears, orbit gears, and controlling means for the orbit gears.

4. In a transmission device, a drive shaft, a driven shaft, fixed gears on the driven shaft, loose gears on the driven shaft, a spider having driving connection with the fixed gears and driven connection with the loose gears, carrier gears rotatably supported on the loose gears and driven by the drive shaft, planet gears on the carrier gears, sun gears on the loose gears engaged by the planet gears, orbit gears engaged with the planet gears, and controlling means for the orbit gears.

5. In a power transmission device, a drive shaft, driven gears of the same diameter adapted to rotate at different relative speeds, a driven shaft, means connecting the drive shaft and driven gears for rotating said driven gears at variable different speeds, means connecting the driven gears and driven shaft for rotating said driven shaft in a direction and at a speed governed by the difference in the relative speeds of said driven gears, said first-named connecting means including carriers operated by the drive shaft, and variable speed means carried by the carriers including planet and orbit gears and operatively including the driven gears and means for controlling the orbit gears.

6. In a power transmission device, a drive shaft, driven gears adapted to rotate at different relative speeds, a driven shaft, means connecting the drive shaft and driven gears for rotating said driven gears at variable different relative speeds, said means including carriers driven by the drive shaft, planet gears and orbit gears supported on said carriers, and sun gears on said driven gears, controlling means for said orbit gears, and means connecting the driven gears and driven shaft for rotating the latter at a speed and in a direction governed by the difference in the relative speeds of said driven gears.

ALPHEUS B. STICKNEY.